P. H. SHAILER.
RESILIENT VEHICLE WHEEL.
APPLICATION FILED OCT. 24, 1912.
1,083,864.
Patented Jan. 6, 1914.
2 SHEETS—SHEET 1.
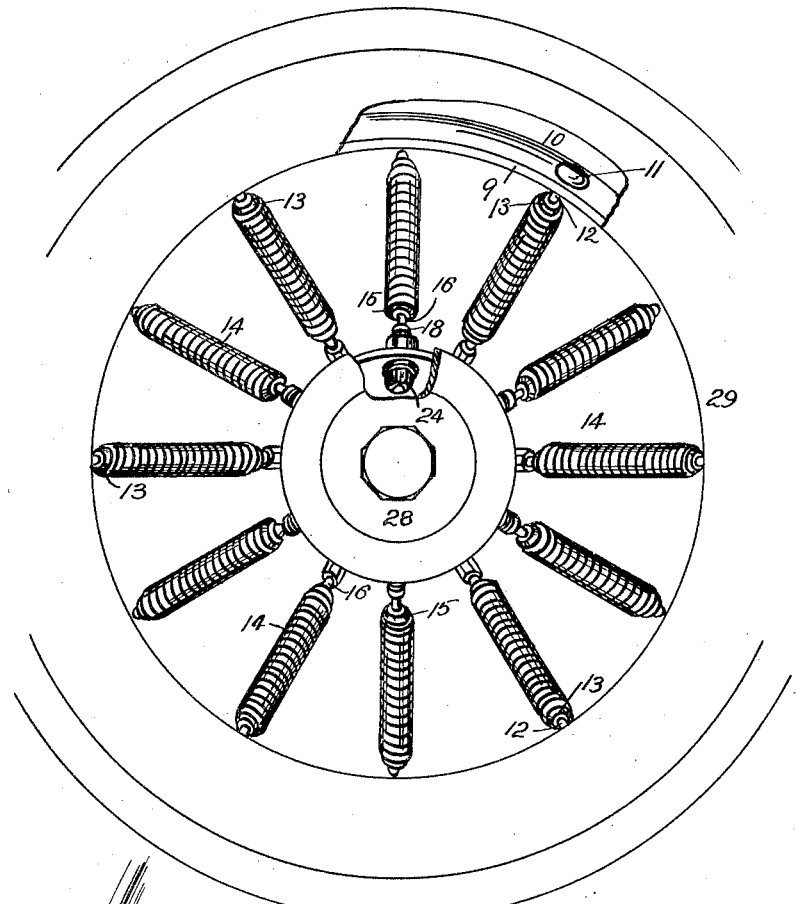
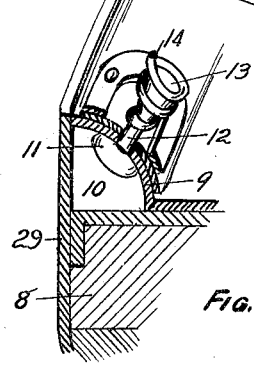
Fig. 1.
Fig. 2.
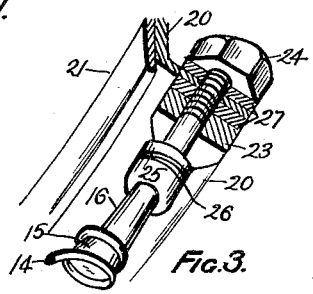
Fig. 3.
Witnesses:
Inventor
Percy H. Shailer P. H. SHAILER.
RESILIENT VEHICLE WHEEL.
APPLICATION FILED OCT. 24, 1912.
1,083,864.
Patented Jan. 6, 1914.
2 SHEETS—SHEET 2.
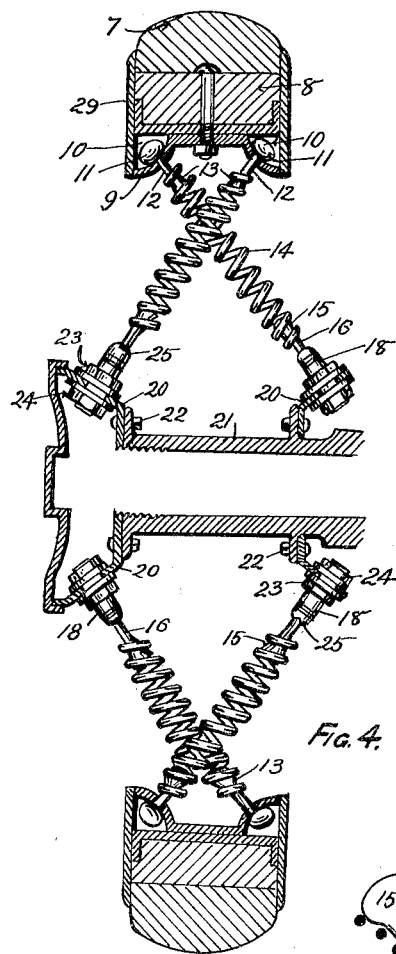
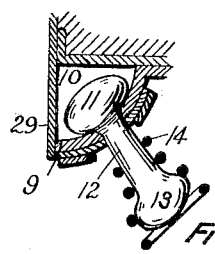
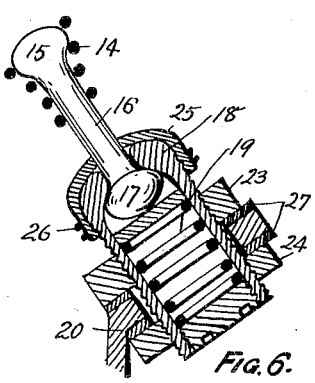
Witnesses:
M. E. McWade
C. D. Kesler
Inventor
Percy H. Shailer
by
James L. Norris
Atty.

UNITED STATES PATENT OFFICE.

PERCY HENRY SHAILER, OF SYDNEY, NEW SOUTH WALES, AUSTRALIA.

RESILIENT VEHICLE-WHEEL.

1,083,864.      Specification of Letters Patent.      Patented Jan. 6, 1914.

Application filed October 24, 1912. Serial No. 727,596.

*To all whom it may concern:*

Be it known that I, PERCY HENRY SHAILER, a subject of the King of Great Britain, residing at 133 King street, Sydney, in the State of New South Wales, Commonwealth of Australia, have invented certain new and useful Improvements in Resilient Vehicle-Wheels, of which the following is a specification.

This invention relates to improvements in resilient vehicle wheels in which spokes are dispensed with, the resiliency being obtained by springs located between the hub of the wheel and the rim, and it has been devised with the object of constructing a wheel which will have such radial tension and lateral resistance as to afford a maximum of efficiency.

In constructing a wheel according to the invention, two plate-like members are provided on the hub, one on either side. Each of such members has connected thereto the inner ends of the alternate members of a series of spiral springs, the outer ends of which springs are secured to a metal rim, but on the opposite side; that is, if one end of a spring is secured to the plate-like member on the inner side of the hub, the other end is secured to the outer side of the rim, and vice versa, alternately.

The tension of the springs is adjusted, and consequently the resiliency of the wheels regulated, by means of nuts taking on threaded casings, each of which is in engagement with a knuckle-bolt or pin holding one end of a spring. But in order that the invention may be readily understood, I now refer to the drawings herewith, in which:—

Figure 1 is a side elevation, broken away in part of a wheel constructed according to the invention, and, Fig. 2 is a section in perspective showing the attachment of the springs to the rim, while, Fig. 3 is a similar view illustrating the attachment of the springs to the hub. Fig. 4 is a sectional elevation of the wheel. Fig. 5 is an enlarged section showing the attachment of the springs to the rim, and, Fig. 6 a similar view showing their attachment to the hub.

The same numerals indicate the same or corresponding parts.

7 is the tread, 8 the rim and 9 an annular plate bolted or riveted to the rim and offset at its longitudinal edges to form recesses 10 for the inner heads 11 of the double headed knuckle-bolts or pins 12. The outer heads 13 are engaged by the springs 14 which also engage the outer ends 15 of the double headed bolts or pins 16. The inner ends 17 of the bolts 16 are housed in casings 18 provided with light springs 19 to hold the bolts up to their seatings in said casings. Each of said casings is threaded on its exterior to permit adjustment in a plate 20 which is bolted or riveted to the hub 21 and 22. The adjustment is obtained by means of the nuts 23—24 taking on the outside of the casing 18.

25 is a leather covering secured by wires or the like 26 to prevent the escape of lubricant from the casing.

27 are washers, and 28—29 cover plates respectively on the rim and hub, said plates being detachable for the purpose of obtaining access or inserting lubricant.

It will be evident that on revolution of the wheel, owing to the tension of the springs being diagonal to the axis of the wheel both radial tension and lateral resistance will be obtained, forming, altogether, a cheap and efficient wheel which will permit of ready adjustment.

If necessary I may effect adjustment of the tension of the springs at the rim by providing a similar device to that at the hub end and illustrated in Fig. 6 or I may adjust the springs at both ends, but since such arrangements would amount merely to a reversal or duplication of parts already shown, further illustration is deemed unnecessary.

I claim,—

In a resilient wheel, the combination, with the hub and rim elements; of a series of radially-arranged springs connecting said elements and inclined alternately in opposite directions with respect to that axis of the wheel, the connection between one end of each spring and the adjacent element comprising an adjustable casing attached to that element and provided with a seat, a double-head knuckle-bolt having one head engaged in said seat and the other head directly attached to the said spring end, and a spring in said casing for holding the first-named bolt head in such engagement.

In testimony whereof I have hereunto set my hand in presence of two subscribing witnesses.

PERCY HENRY SHAILER.

Witnesses:
CHARLES G. GRAHAM,
HENRY W. CLARKE.